United States Patent
Heckel et al.

(10) Patent No.: US 11,426,836 B2
(45) Date of Patent: Aug. 30, 2022

(54) ROLLER BURNISHING TOOL

(71) Applicant: Guehring KG, Albstadt (DE)

(72) Inventors: Gerd Heckel, Puschendorf (DE); Hans-Peter Hollfelder, Fuerth (DE); Juergen Thanner, Hilpoltstein (DE)

(73) Assignee: Guehring KG, Albstadt (DE)

( * ) Notice: Subject to any disclaimer, the term of this patent is extended or adjusted under 35 U.S.C. 154(b) by 133 days.

(21) Appl. No.: 16/751,310

(22) Filed: Jan. 24, 2020

(65) Prior Publication Data
US 2020/0262026 A1    Aug. 20, 2020

Related U.S. Application Data

(63) Continuation of application No. PCT/EP2018/063553, filed on May 23, 2018.

(30) Foreign Application Priority Data

Jul. 28, 2017    (DE) .................... 10 2017 213 045.8

(51) Int. Cl.
*B24B 39/02*     (2006.01)
*B23P 9/02*      (2006.01)
*C21D 7/08*      (2006.01)

(52) U.S. Cl.
CPC .............. *B24B 39/023* (2013.01); *B23P 9/02* (2013.01); *C21D 7/08* (2013.01)

(58) Field of Classification Search
CPC ....... B24B 39/023; B24B 39/00; B24B 39/02; B23P 9/02; C21D 7/08; B23B 27/24; C23C 4/02
See application file for complete search history.

(56) References Cited

U.S. PATENT DOCUMENTS

| | | |
|---|---|---|
| 3,343,390 A | 9/1967 | Harns |
| 2005/0217336 A1 | 10/2005 | Weidmer |
| 2008/0219787 A1 | 9/2008 | Weidmer |
| 2010/0101526 A1* | 4/2010 | Schaefer .................. C23C 4/02 |
| | | 123/193.2 |

(Continued)

FOREIGN PATENT DOCUMENTS

| | | |
|---|---|---|
| DE | 20 2009 014 180 U1 | 1/2010 |
| DE | 10 2012 207 455 A1 | 6/2012 |
| DE | 10 2014 223 038 A1 | 5/2016 |

(Continued)

OTHER PUBLICATIONS

DE-202015008681-U1 Machine translation (Year: 2017).*

(Continued)

*Primary Examiner* — Lee A Holly
(74) *Attorney, Agent, or Firm* — Burr & Brown, PLLC

(57) ABSTRACT

The invention relates to a roller burnishing tool 10 with a base body 12 extending along a longitudinal center axis 11, at least one roller holder 14 arranged radially adjustably on the base body 12, which holds a roller 15 rotatably, and an adjusting device 16 arranged in the base body 12 for adjusting the roller holder 14 cooperates in the radial direction with the roller holder 14. According to the invention, the roller holder 14 has a holder arm 18*b* holding the roller 15, which can be pivoted out in a radial direction by the adjusting device 16 relative to the base body 12 in a radial direction.

22 Claims, 3 Drawing Sheets

(56) References Cited

U.S. PATENT DOCUMENTS

2012/0317790 A1   12/2012   Flores et al.
2013/0319063 A1   12/2013   Schmid et al.

FOREIGN PATENT DOCUMENTS

| DE | 102014223038 A1 * | 5/2016 | ............ B23B 27/24 |
| DE | 202015008681 U1 * | 3/2017 | ........... B24B 39/023 |
| DE | 10 2015 226 062 A1 | 6/2017 | |
| EP | 0035091 A1 | 9/1981 | |
| SU | 525534 A | 11/1976 | |
| SU | 1418027 A | 8/1988 | |
| WO | 2008/109484 A1 | 9/2008 | |
| WO | 2012/084612 A1 | 6/2012 | |

OTHER PUBLICATIONS

DE-102014223038-A1 Machine Translation (Year: 2016).*
International Search Report and Written Opinion of the International Searching Authority (and English translation) from a corresponding International patent application (PCT/EP2018/063553) dated Sep. 17, 2018, 19 pages.
DPMAregister from a corresponding German patent application (DE 10/2017 213 045.8) printed on Feb. 12, 2020, 2 pages.
International Preliminary' Report on Patentability' from a corresponding International patent application (PCT/EP2018/063553) dated Jan. 28, 2020, 8 pages.

* cited by examiner

ROLLER BURNISHING TOOL

The invention relates to a roller burnishing tool with a base body extending along a longitudinal central axis, at least one roller holder, which is radially adjustably arranged on the base body and on which a rolling cylinder is mounted, and a control device arranged in the base body, which interacts with the roller holder for adjusting the roller holder in a radial direction.

Such a roller burnishing tool is used for roller burnishing a workpiece surface, so as to obtain a defined surface structure, surface quality or surface geometry. To this end, the roller burnishing tool is rolled on the workpiece surface to be processed with a prescribed contact pressure, as a result of which the workpiece surface to be processed undergoes plastic deformation. For example, this type of tool is used to further process the inner surface of a cylinder bore or a cylinder liner of a combustion engine, into which a threadlike microgroove structure was already introduced, so as to generate undercuts by plastically deforming the webs formed between the microgrooves, and thereby create a surface structure suitable for the application of a coating material. Examples for such roller burnishing tools are indicated in DE 20 2009 014 180 U1, DE 10 2012 207 455 A1 or WO 2012/084612 A1.

DE 20 2009 014 180 U1 or DE 10 2012 207 455 A1 indicates a roller burnishing tool with a base body extending along a longitudinal central axis, a roller holder arranged in a recess in the base body so as to be radially displaceable, on which a rolling cylinder is mounted, and a central control device, which has an adjusting rod axially displaceable in the base body with a control slant running inclined to the longitudinal central axis, against which the roller holder flatly abuts. The control slant of the control device together with the abutting slanted surface of the roller holder form a wedge gear, which converts an axial displacement of the adjusting rod into a radial displacement of the roller holder.

Known from WO 2012/084612 A1 is a roller burnishing tool with a functionally similar design. However, in the roller burnishing tool indicated therein, the roller holder abuts against two control surfaces of a central adjusting rod in the base body via two slanted surfaces.

The tools indicated in the aforementioned publications share in common that, viewed in the displacement direction of the roller holder, the recess that accommodates the roller holder has a rectangular cross section corresponding to the outer contour of the roller holder, and extends in a radial direction from the outer periphery of the base body up to the central adjusting rod. Viewed in an axial direction and in a peripheral direction of the roller burnishing tool, the roller holder is accommodated in the recess essentially without play, so that the roller holder can essentially be displaced radially along a straight line. The recess penetrating through the base body weakens the base body considerably. In addition, because it rubs against both the side walls bordering the recess in an axial direction and peripheral direction and the control surface of the adjusting rod, the roller holder experiences a rather significant resistance to a radial displacement, which makes a fine adjustment more difficult.

Proceeding from the prior art discussed above, the object of the invention is to create a roller burnishing tool with a stable design that enables a fine adjustment of the roller holder.

This object is achieved by a roller burnishing tool with the features in claim 1. Advantageous or preferred further developments are the subject of dependent claims.

A roller burnishing tool according to the invention, which can be operated immovably or rotatably, has a base body extending along a rotational or longitudinal central axis, at least one roller holder radially adjustably arranged on the base body with a rotatably mounted rolling cylinder and a control device arranged in the base body, which interacts with the roller holder for radially adjusting the roller holder in a radial direction. For example, a roller burnishing tool according to the invention is used for further processing the inner surface of a cylinder bore or that of a cylinder liner of a combustion engine, into which a threadlike microgroove structure has been introduced, so as to generate undercuts by plastically deforming the webs formed between the microgrooves, and thereby create a surface structure suitable for the application of a coating material.

As opposed to the prior art discussed at the outset, the roller holder has a holder arm that can be pivotably deflected in a radial direction by the control device. As a result, the rolling cylinder is no longer displaced in a radial direction by radially displacing the roller holder along a straight line, but rather by pivoting the holder arm of the roller holder, which changes the position of the rolling cylinder held on the roller holder in a radial and axial direction.

As opposed to the prior art discussed at the outset, where a radial shifting of the rolling cylinder is achieved by displacing the entire roller holder, it is sufficient for the roller burnishing tool according to the invention that the holder arm of the roller holder be radially adjustable. To this end, the roller holder is arranged on the base body, for example in a peripherally open receiving pocket incorporated into the base body, in such a way that the holder arm, meaning only a part of the roller holder, is arranged so that it can be pivoted in a radial direction. For example, the holder arm can be supported on the central control device by means of a pressure element that can be displaced in a radial recess in the base body, e.g., a pressure pin or pressure bolt. The pressure element acting between the control device and roller holder can be kept relatively small in terms of its cross sectional size. For this reason, a recess in the base body that radially movably guides the pressure element can be significantly smaller in design relative to its expansion in one direction transverse to the displacement direction of the pressure element than a recess that takes up the entire roller holder, so that this recess extending up to the control device weakens the base body to less of an extent. The smaller recess makes it possible to distribute a larger number of roller holders in the peripheral direction of the roller burnishing tool.

In addition, mounting and attaching the pivotable holder arm to the base body is essentially reduced to a pivoting axis realized by a pin or bolt, for example, on which the holder arm is pivotably mounted. This permits contact surfaces between the holder arm and base body, for example the side surfaces that border a receiving pocket, on which friction can arise, that are smaller than in the prior art discussed above.

For example, pivotably arranging the holder arm that holds the rolling cylinder allows the roller holder to be designed as a bendable clamping holder fastened to the base body, with a holder arm that can be pivoted via elastic bending and holds the rolling cylinder, or as a pivoting holder pivotably fastened to the base body, with a holder arm that holds the rolling cylinder. Such bendable clamping holders or pivotable holders have already proven themselves in roller burnishing tools (e.g., see those in DE 20 2009 014 180 U1 or DE 10 2012 207 455 A1) in attaining a finely adjustable arrangement of an insert holder that carries a cutting tool. However, these types of bendable clamping holders or pivotable holders have not yet been drawn upon for arranging a rolling cylinder on a base body. One reason why might lie in the fact that the angle of the roller axis of the rolling cylinder relative to the longitudinal central axis of the roller burnishing tool can change during a pivoting motion of the holder arm, so that the alignment of the rolling surface of the rolling cylinder, which is held on the pivotable holder arm and is to be pressed against the workpiece surface to be processed, might also change, provided the position of the roller axis of the rolling cylinder relative to the pivotable holder arm is invariable. By contrast, the roller holders are radially displaced along a straight line in the roller burnishing tools discussed at the outset, as a result of which the alignment of the rolling cylinder relative to the rotational or longitudinal central axis of the roller burnishing tool is always retained. This can be necessary for roller burnishing of some kind, in particular in cases where the roller burnishing is intended to imprint or form a defined geometric structure, for example a threadlike structure, into a cylindrical workpiece surface to be processed, for example into a piston running surface of a combustion engine, and the rolling cylinder is for this reason to remain pressed against the workpiece surface in the same angular position or alignment, even given a change in the contact pressure.

With this in mind, the rolling cylinder can have a rolling surface that is curved convexly outward or spherical. If the rotational axis of the rolling cylinder is tilted by a pivoting motion of the holder arm of the roller holder relative to the rotational or longitudinal central axis of the rolling cylinder, the sphericity of the rolling surface makes it possible to maintain an essentially constant contact pressure, even if the pressing parts of the rolling cylinder might become slightly axially displaced on the workpiece surface to be processed in relation to the rotational or longitudinal central axis of the roller burnishing tool.

The above notwithstanding, the circumstance described above can be addressed by also mounting the rolling cylinder on the pivotable holder arm in such a way that the roller axis of the rolling cylinder, when exposed to the contact pressure of the workpiece surface to be processed during a pivoting motion of the holder arm, is aligned in such a way as to yield a broad abutment for the rolling cylinder of the workpiece surface to be processed.

To this end, for example, the rolling cylinder can be mounted in a roller cage fastened to the roller holder, for example in a replaceable manner. Mounting in the roller cage can involve having the roller axis of the rolling cylinder in the roller cage be clearly defined. If the roller cage is now mounted on the pivotable holder arm of the roller holder so that it can rotate around a cage axis aligned transverse to the rotational or longitudinal central axis of the roller burnishing tool and stands perpendicular on a longitudinal sectional plane of the roller burnishing tool containing the rotational or longitudinal central axis of the roller burnishing tool, a rotation around the cage axis during exposure to the contact pressure of the workpiece surface to be processed allows the roller cage to be aligned in such a way as to yield a flush abutment of the rolling cylinder against the workpiece surface to be processed.

In each case, the invention can be used to create a more stable roller burnishing tool that permits a fine adjustment of the pivotable holder arm that holds the rolling cylinder in order to achieve a highly precise diameter for the rolling cylinder.

In a preferred embodiment, the control device interacts with the roller holder via a wedge gear. To this end, the control device can have a control means arranged in the base body in an axially adjustable manner, e.g., an adjusting rod or the like, with a control surface that is slanted relative to the rotational or longitudinal central axis of the roller burnishing tool, and supports a pressure element that presses against the holder arm of the roller holder, e.g., a pressure pin or pressure bolt. For this purpose, the pressure element can be guided in a radially displaceable manner in an allocated recess in the base body.

In order to adjust the radial position of the roller holder relative to the control device or base body, an adjusting device can be provided between the roller holder and control device. For example, this type of adjusting device can be integrated into the pivotable holder arm of the roller holder. In this case, the aforementioned pressure element can be arranged between a control slant on the control device side and the adjusting device.

In a preferred embodiment, the roller burnishing tool has a plurality of roller holders distributed around the rotational axis with a prescribed, preferably identical, angular division, which can preferably be synchronously adjusted by the control device. In addition, the roller holders can be arranged at the same height as viewed in the axial direction, which offsets the forces that act on the roller burnishing tool during a roller burnishing process.

The control device can have a threaded sleeve that is arranged in the base body in a nonrotatable, but axially displaceable manner, and a threaded drive that drives the threaded sleeve. Thanks to the threaded drive, the control device allows a precise, finely dosed setting of the roller holder position relative to the rotational or longitudinal central axis of the roller burnishing tool. In the simplest case, the threaded drive can have a threaded spindle screwed with the threaded sleeve, which initiates an axial displacement of the threaded sleeve when rotatably actuated.

In a preferred embodiment, the threaded spindle can be actuated from the front side of the base body. Actuation can take place manually or controlled by a machine tool. To this end, a rotatable, but axially fixed actuating element can be provided at the end face of the base body, and engages with the threaded spindle in a nonrotatable, but axially movable manner.

By way of an axial displacement, the threaded drive that displaces the threaded sleeve makes it possible to adjust the roller holder between an inwardly regulated position, in which the rolling cylinder held on the roller holder lies at a minimum diameter, and an outwardly regulated position, in which the rolling cylinder held on the roller holder lies at a maximum diameter. The threaded drive thus allows a precise, fine adjustment of the roller holder independent of the adjustment between the inwardly regulated position and outwardly regulated position.

For example, this type of adjustment of the roller holder between an inwardly regulated position, in which the rolling cylinder held on the roller holder lies at a minimum diameter, and an outwardly regulated position, in which the rolling cylinder held on the roller holder lies at a maximum diameter, can be realized by having the threaded drive be connected with a piston arranged in a pressure chamber in the base body. The piston can be elastically, preferably resiliently, supported relative to the base body.

In a preferred embodiment, the threaded drive can have a threaded spindle that is screwed with the threaded sleeve. For example, this threaded spindle can be connected with the piston mentioned above, although this is not mandatory. In order to achieve an especially fine positional adjustment, the threaded spindle can be comprised of a differential threaded spindle. In this case, the threaded drive can further have a bearing bush arranged between the threaded sleeve and the piston, for example which is connected with the piston mentioned above in a tension/pressure-resistant manner, and the differential threaded spindle can be screwed with the threaded sleeve with a first threaded section, and with the bearing bush with a second threaded section.

To reduce an unavoidable thread play between the threaded drive and threaded sleeve, a compression spring can be arranged between the threaded sleeve and threaded drive, making it possible to achieve a high dimensional accuracy in terms of diameter.

A preferred embodiment of a roller burnishing tool having a plurality of roller holders will be described below with the help of the attached drawings. Shown on:

PREFERRED EMBODIMENT

Figure 1:
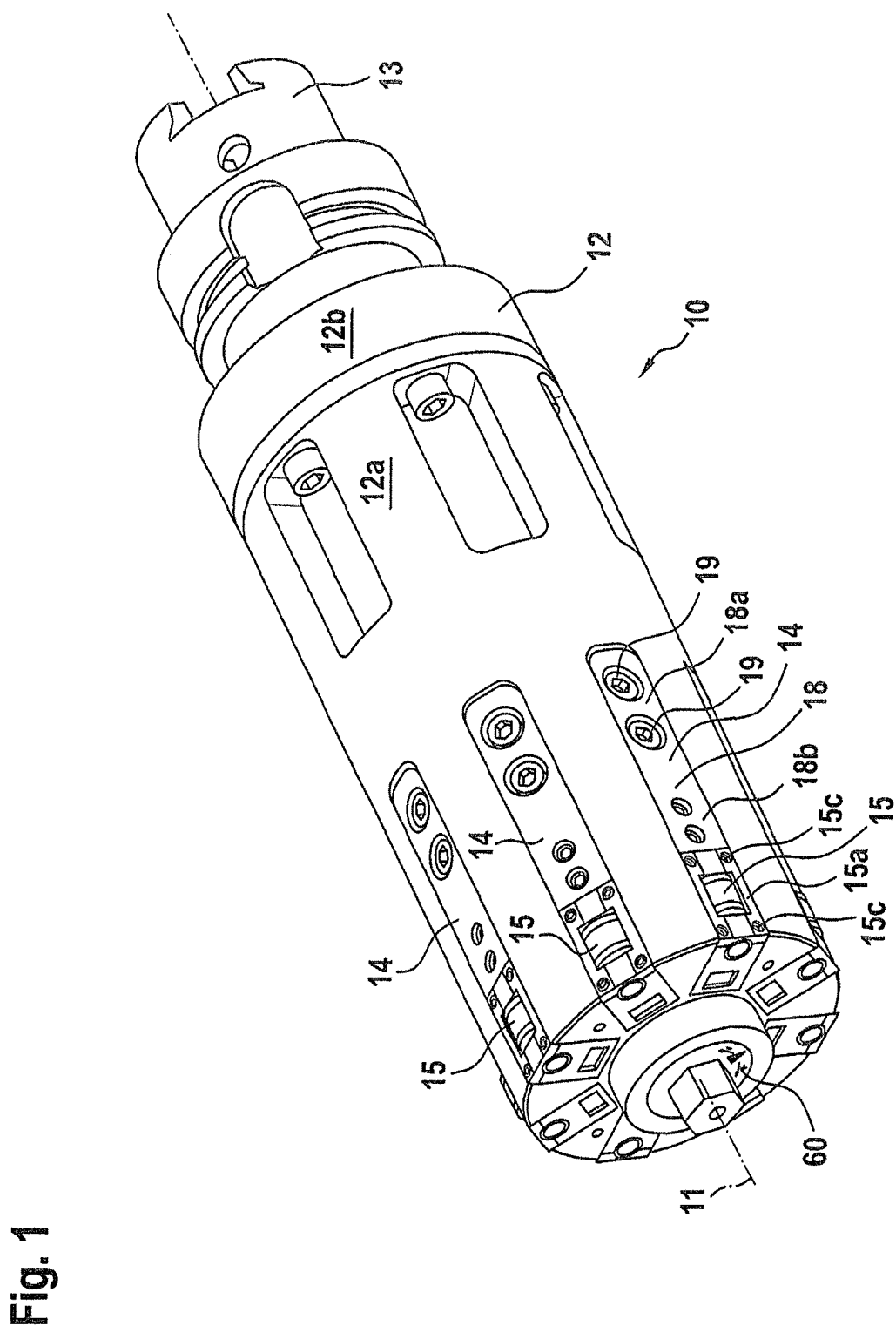
FIG. 1 is a perspective side view of a roller burnishing tool according to the invention.

FIG. 1 shows a perspective side view of a roller burnishing tool 10, for example which is used to further process the inner surface of a cylinder bore or a cylinder liner of a combustion engine, into which a threadlike microgroove structure was already introduced, so as to generate undercuts by plastically deforming the webs formed between the microgrooves, and thereby create a surface structure suitable for the application of a coating material.

The roller burnishing tool 10 has a base body 12 extending along a rotational or longitudinal central axis 11, which in the embodiment shown is modularly constructed out of a front part 12a and a rear part 12b. As shown on FIG. 1, the front part 12a and rear part 12b are screwed together. The rear (right on FIG. 1) end of the roller burnishing tool 10 has a coupling shaft 13, for example which is to be connected with a machine tool spindle, and in the embodiment shown is comprised of an HSC (hollow shaft cone) shaft. As an alternative, however, a so-called steep taper (ST) shaft or the like can be provided, for example. The roller burnishing tool 10 can be used while immovably or rotatably driven.

At the front (left on FIG. 1) end of the roller burnishing tool 10, eight roller holders 14 are arranged in the base body 12 in an equidistant angular division. In particular, the roller holders are arranged at the same height in an axial direction. Each roller holder 14 bears a rolling cylinder 15, and can be adjusted radially inwardly or outwardly synchronously with the respective other roller holders 14 by means of a central control device 16 visible on FIG. 2. Independently thereof, each roller holder 14 can be individually positionally adjusted via an allocated adjusting device 17 in a radial direction relative to the central control device 16 or to the rotational or longitudinal central axis 11 of the base body 12.

Roller Holder 14

The roller holders 14 are all characterized by an identical structural design and an identical operating principle, so that the structural design and operating principle of the roller holders 14 will be described below based on the example of the lower roller holder 14 shown on FIG. 2.

Figure 3:
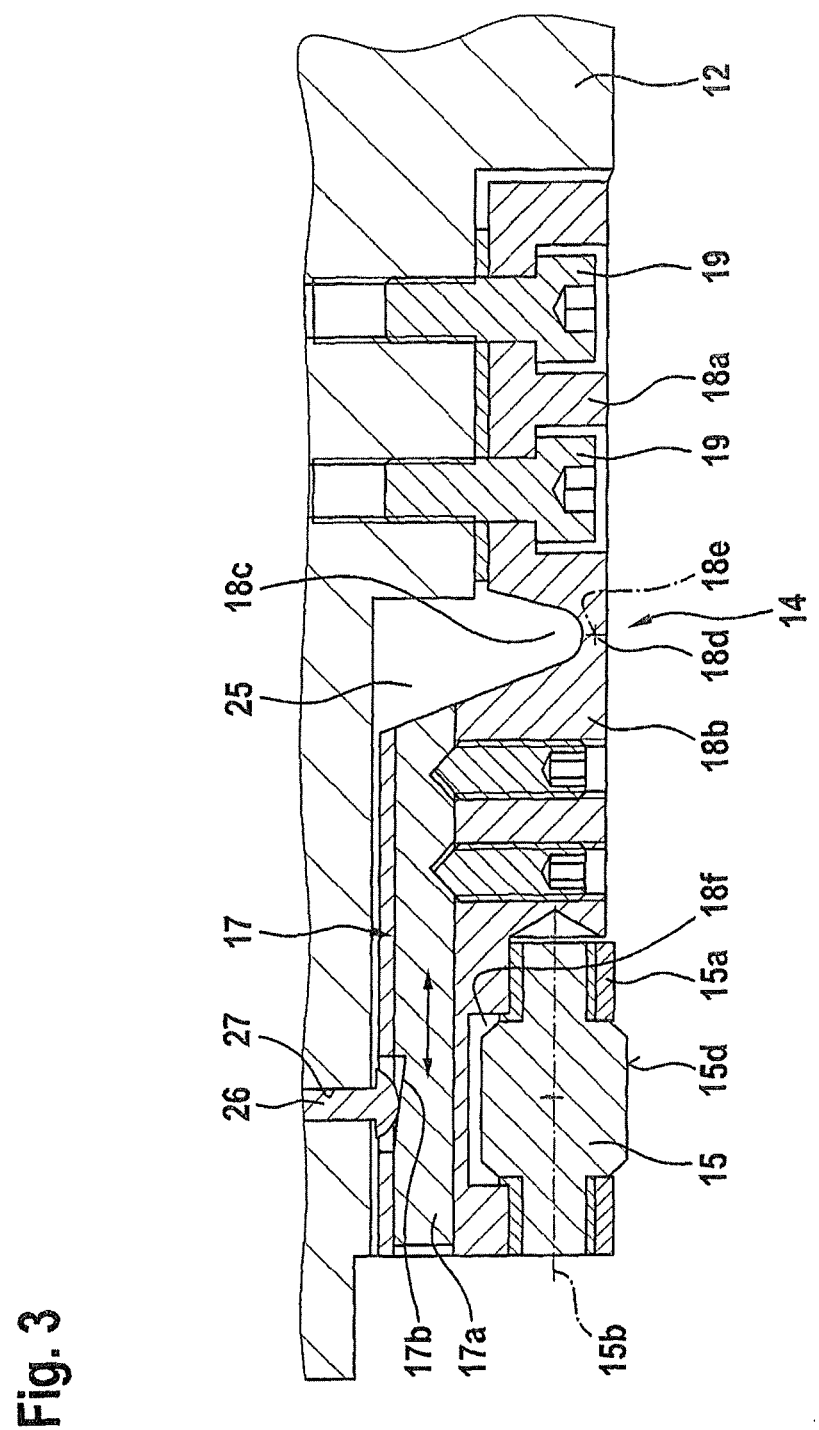
FIG. 3 is a cutout of the longitudinal sectional view on FIG. 2 on a magnified scale.

The roller holder 14 shown on a magnified scale on FIG. 3 essentially has one holder body 18, a holder arm 18b pivotably connected with the holder body 18a in a radial direction, the rolling cylinder 15 held on the holder arm 18, two clamping screws 19 for clamping the holder body to the base body and an adjusting device 17.

As evident from the figures, the holder body 18 is fabricated out of a prismatic or cuboid block, which is accommodated in a prismatic or cuboid receiving pocket 25 in the base body 12 that is open at the face and outer periphery, extends in the direction of the rotational or longitudinal central axis 11 of the base body 12, and is formed at a radial distance to the rotational or longitudinal central axis 11. In relation to a longitudinal sectional plane (see FIG. 3) containing the rotational or longitudinal central axis 11, the receiving pocket 25 is essentially symmetrically shaped in terms of its cross section (see FIG. 1).

The roller holder 14 designed like a type of bendable clamping holder has the holder body 18a, which is fixedly attached to the base body 12 via the two clamping screws, and the holder arm 18b that can be pivotably adjusted in a radial direction, which is connected with the holder body 18a via a material joint 18d formed by a recess 18c. The material joint 18d allows the holder arm 18b to elastically bend or deflect in a radial direction around an imaginary pivoting axis 18e sketched on FIG. 3.

The rolling cylinder 15 is mounted in a roller cage 15a fastened to the holder arm 18b so that it can rotate around a roller axis 15b. As shown on the figures, the roller cage 15a is tightly accommodated in a recess 18f in the pivotable holder arm 18b that is open on the outer periphery, and fastened to the holder arm 18b via fastening screws 15c. In the state depicted on FIG. 2, the roller axis 15b is parallel to the rotational or longitudinal central axis 11 of the roller burnishing tool 10. However, the angular position of the roller axis 15b, and hence also the alignment of the rolling cylinder 15 as a whole, change with a radial pivoting of the holder arm 18b. With this in mind, the rolling cylinder 15 has a rolling surface 15d that is curved convexly outward or spherical. The sphericity of the rolling surface 15d makes it possible to achieve an essentially constant contact pressure for each pivoting position of the rolling cylinder 15, even if the pressing parts of the rolling cylinder 15 might become slightly axially displaced on the workpiece surface to be processed in relation to the rotational or longitudinal central axis 11 of the roller burnishing tool 11.

Figure 2:
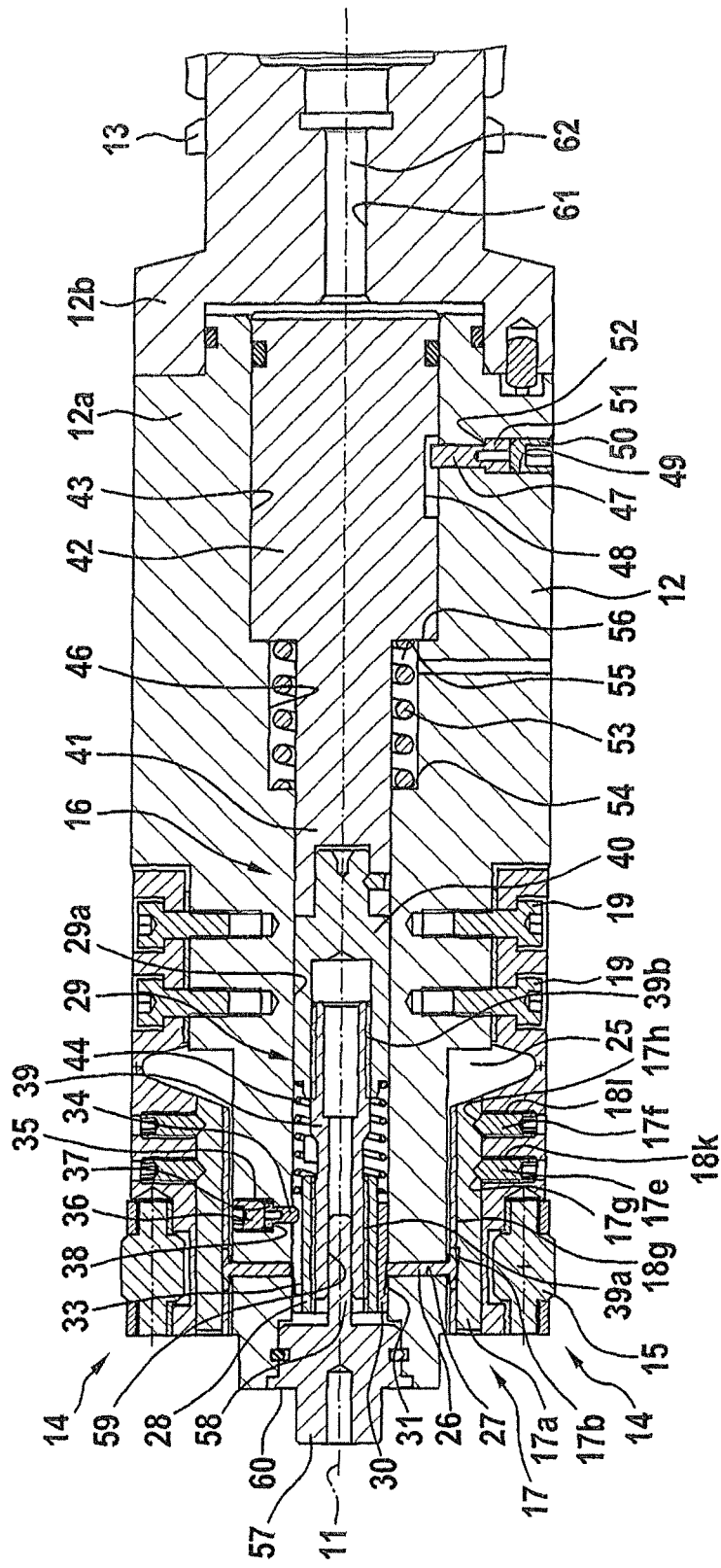
FIG. 2 is a longitudinal sectional view of the roller burnishing tool.

As shown on FIG. 2, the holder arm 18b is supported on a control slant 31 on the control device side via a pressure pin 26 radially movably guided in the base body. On the roller holder side, the pressure pin 26 presses in particular against a slanted surface 17b on an adjusting strip 17a described in more detail later, which as part of the adjusting device 17 is displaceably arranged in the longitudinal direction of the holder arm 18b.

FIG. 2 shows that the holder body 18 is supported on the control surface 31 of the central control device 16 via the adjusting strip 17a of the adjusting device 17 integrated into the holder arm 18b and the pressure pin 26 arranged in the base body 12 in a radially displaceable manner.

Control Device 16

As shown on FIG. 2, the central control device 16 has a threaded sleeve 28 arranged in the base body 12 and a threaded drive 29 that axially displaces the threaded sleeve 28.

The threaded sleeve 28 comprises a control means that induces a radial adjustment of the roller holders 14. It is arranged in a central bore 29a in the base body 12 in a nonrotatable, but axially displaceable manner, and interacts with the roller holders 14 via a wedge gear. To this end, as shown on FIG. 2, the outer periphery of the threaded sleeve 28 has a number of support strips 30 corresponding to the number of roller holders 14. Each support strip 30 is here allocated to one of the roller holders 14, and on the exterior has the control surface 31 that is slanted relative to the rotational or longitudinal central axis 11, against which the pressure pin 26 that interacts with the roller holder 14 abuts. Each pressure pin 26 is arranged in a radially running bore 27 in the base body 12 in a radially displaceable manner. The control slant 31 together with the front side of the pressure pin 26 forms an already mentioned wedge gear, which converts an axial movement by the threaded sleeve 28 into a radial movement of the pressure pin 26. The nonrotatable arrangement of the threaded sleeve 28 in the central bore 29a in the base body 12 is achieved by a locking pin 34 that engages into an axial longitudinal slit 33 on the outer periphery of the threaded sleeve 28, and is detachably held in a radial stepped bore 35 in the base body 12. As shown on FIG. 2, a locking screw 36 secures the engagement of the locking pin 34 in the longitudinal slit 33 of the threaded sleeve 28. The locking pin 34 has a head with an enlarged diameter, which strikes radially inwardly against a step 38 of the stepped bore 35. By fixing the locking pin 34 in a radial direction in this way, the locking pin 34 can be prevented from pressing against the base of the longitudinal slit 33, and thereby impeding the axial displaceability of the threaded sleeve 28.

The threaded sleeve 28 is axially driven via the threaded drive 29. As shown on FIG. 2, the threaded drive 29 essentially has a threaded spindle 39 and a bearing bush 40 arranged at an axial distance to the threaded sleeve 28 in the central bore 29a in the base body 12. In the embodiment shown, the threaded spindle 39 is comprised of a differential threaded spindle, which is screwed with an internally threaded bore of the threaded sleeve 28 via a first threaded section 39a, and with an internally threaded bore of the bearing bush 40 via a second threaded section 39b.

Analogously to the threaded sleeve 28, the bearing bush 40 is arranged in the central bore 29a in the base body 12 in a nonrotatable, but axially displaceable manner. The nonrotatable arrangement of the bearing bush 40 is achieved by a nonrotatable connection with a piston extension 41 of a piston 42 to be described later, which is arranged in a piston bore 43 in the base body 12 in a nonrotatable, but axially displaceable manner.

A compression spring 44 is arranged between the threaded sleeve 28 and the bearing bush 40, so as to reduce a thread play between the male thread of the first threaded section 39a of the threaded spindle 39 and the female thread of the threaded sleeve 28 on the one hand, and to reduce a thread play between the male thread of the second threaded section 39b of the threaded spindle 39 and the female thread of the bearing bush 40 on the other.

The threaded drive 29 configured in this way offers two options for axially displacing the threaded sleeve 28 that are independent of each other:

1) Synchronous Inward/Outward Regulation of the Roller Holders 14

On the one hand, displacing the bearing bush 40 makes it possible to displace the entire threaded drive 29 along with the threaded sleeve 28 without twisting the threaded spindle 39, i.e., without a relative movement between the threaded sleeve 28 and the bearing bush 40. This adjustment option is used to synchronously adjust the roller holders between an inwardly regulated position, in which the rolling cylinders 15 held on the roller holders 14 lie at a minimum diameter, and an outwardly regulated position, in which the rolling cylinders 15 held on the roller holder 14 lie at a maximum diameter.

To this end, the threaded drive 29, in particular the bearing bush 40, is connected with the already mentioned piston 42 in a tension/pressure-resistant manner. The piston 42 is arranged in a piston bore 43 in the base body in a nonrotatable, but axially adjustable manner. As evident from FIG. 2, the piston bore 43 is connected with the central bore 29a via a connecting bore 46. The piston 42 with a step-like design has a piston extension 41, which penetrates through the connecting bore 46, and is connected with the bearing bush 40 in the area of the central bore 29a in a nonrotatable and tension/pressure-resistant manner. The nonrotatable arrangement of the piston 42 in the piston bore 43 is achieved by a locking pin 47 that engages into an axial longitudinal slit 48 on the outer periphery of the piston 42, and is detachably held in a radial stepped bore 49 in the base body 12. As shown on FIG. 2, a locking screw 50 secures the engagement of the locking pin 47 in the longitudinal slit 48 of the piston 42. The locking pin 47 has a head 51 with an enlarged diameter, which strikes radially inwardly against a step 52 of the stepped bore 49. By fixing the locking pin 47 in a radial direction in this way, the locking pin 47 can be prevented from pressing against the base of the longitudinal slit 48, and thereby impeding the axial displaceability of the piston.

Tensioned between the piston 42 and base body 12 is a compression spring 53, which displaces the piston 42 on FIG. 2 toward the right. The compression spring 53 is supported on a step 54 formed between the connecting bore 46 and central bore 29a on the base body side, while the compression spring 53 is supported on an annular surface 55 that envelops the piston extension 41 of the piston 42 on the piston side.

A step 56 formed between the connecting bore 46 and the piston bore 43 yields an axial stop for the piston 42. In the embodiment shown, the piston 42 is fluidically driven toward the left, against the spring force of the compression spring on FIG. 2. To this end, the piston 42 is accommodated in the piston bore 43 in a sealed manner. A pressure channel 61 formed in the base body 12 is used to feed a fluid pressure into a pressure chamber 62 of the piston bore 43 bordered by the piston, which displaces the piston 42 toward the left, against the spring force of the compression spring 53 on FIG. 2. Displacing the piston 42 induces a codirectional shifting of the bearing bush 40, and hence of the threaded drive 29 and the threaded sleeve 29.

The roller holders 14 supported on the control slants 31 of the threaded sleeve 26 can thus be synchronously inwardly and outwardly regulated, i.e., adjusted radially inward and outward, through exposure to a pressure of the piston 42 exerted by a machine tool.

2) Synchronous Coarse or Preliminary Adjustment of the Rolling Cylinders 15

On the other hand, twisting the threaded spindle 39, e.g., in the state shown on FIG. 2 where the piston 42 abuts against the stop 56, makes it possible to adjust the threaded sleeve 28 relative to the bearing bush 40. Due to the nonrotatable and tension/pressure-resistant connection with the piston 42, neither the axial position nor the rotational position of the bearing bush 40 changes when twisting the threaded spindle 39. Suitably designing the difference in pitch between the first threaded section 39a and the second threaded section 39b of the threaded spindle 39 makes it possible to achieve a precise displacement of the threaded sleeve 28, and thus a precise adjustment of the roller holders 14. This adjustment option can be used for a synchronous, coarse adjustment of the rolling cylinders 15 held on the roller holders 14 in the direction of a prescribed nominal diameter.

To this end, the control device 16 has a rotatable, but axially fixed actuating element 57 held on the end face of the base body 12, which engages with the thread spindle 39 in a nonrotatable, but axially movable manner. In the embodiment shown, the actuating element 57 has an extension 58 with a square cross section, which positively engages into an engagement opening 59 of the threaded spindle 39 having a square cross section. The threaded spindle 39 is also twisted along with the actuating element 57. Due to the screwed connection with the threaded sleeve 28, the latter is axially displaced when twisting the threaded spindle 39. With respect to an exemplary manual actuation of the actuating element 57, the actuating element can have a scale ring as visible on FIG. 1, which enables a verifiable twisting of the actuating element 57, and thus of the threaded spindle 39.

The roller holders 14 supported on the control slants of the threaded sleeve 28 can thus be synchronously set to a prescribed nominal diameter by rotationally actuating the actuating element 57 by hand or with a machine tool. This preliminary adjustment can be made in the outwardly regulated state of the roller holders 14 shown on FIG. 2, in which the rolling cylinder 15 lies at a maximum diameter. However, the preliminary adjustment can naturally also take place in an inwardly regulated state of the roller holders 14. This adjustment makes it possible to vary the contact pressure of the rolling cylinders 15 on the workpiece surface to be processed.

Adjusting Device 17

Precisely when it comes to machining an inner surface of a cylinder bore or a cylinder liner of a combustion engine, it can be crucial that all rolling cylinders 15 lie exactly on a prescribed nominal diameter of the roller burnishing tool 10. Only then can an identically high contact pressure be achieved for all rolling cylinders, which is required for a uniform pressure processing of the surface to be processed. In order to satisfy this requirement, it must be possible to readjust the rolling cylinders 15 to a prescribed nominal diameter with µm precision. For example, this is required when the roller burnishing tool 10 is newly delivered, or if wear necessitates that individual rolling cylinders 15 be readjusted.

For this purpose, the holder arm 18b of each roller holder 14 can be positionally adjusted in the radial direction in relation to the base body 12, in particular to the central control device 16 arranged in the base body 12. Each holder arm 14 has allocated to it an individually actuatable adjusting device 17, which can be used to radially set the holder arm 14, and hence the rolling cylinder 15 mounted on the holder arm, relative to the base body 12, in particular to the rotational or longitudinal central axis 11.

The adjusting device 17 integrated into the pivotable holder arm 18b of the roller holder 14 has the already mentioned adjusting strip 17a along with two tapered screws 17e, 17f. The adjusting strip 17a with an essentially square cross sectional design is positively accommodated in a displaceable manner in a guide recess 18g formed in the holder arm 18b. The position of the adjusting strip 17a in the longitudinal direction of the holder arm 18b is determined by the two tapered screws 17a, 17f, which each press against an allocated conical surface of two countersinks 17g, 17h in the adjusting strip 17a that are spaced apart in the displacement direction of the adjusting strip 17a. The threaded bores 18k, 18l that accommodate the tapered screws 17e, 17f penetrate through the holder arm 18b in a direction transverse to the displacement direction (see FIG. 3) of the adjusting strip 17a. The two tapered screws 17e, 17f can thus be actuated from outside the roller burnishing tool 10 by means of a suitable tool key. The adjusting strip 17a has worked into it the slanted surface 17b inclined relative to its displacement direction and to the rotational or longitudinal central axis 11 of the roller burnishing tool 10. The two tapered screws 17e, 17f can be used to adjust the position of the adjusting strip 17a relative to the holder arm 18b, and thus also the position of the slanted surface 17b on the adjusting strip 17a relative to the pressure element 26, thereby making it possible to set the contact point between the slanted surface 17b on the adjusting strip 17a and the pressure element 26 supported on the control device side in a radial direction of the roller burnishing tool 10.

FIG. 2 shows that the pressure element 26 is supported on the adjusting strip 17a on the control device-side control surface 31 at its control device-side end, and on the slanted surface 17b at its roller holder-side end.

The adjusting device 17 integrated into the roller holder 14 thus enables a fine adjustment of the rolling cylinder 15 relative to the rotational or longitudinal central axis 11 of the roller burnishing tool 10.

Integrating the adjusting device 17 into the holder body 18 yields a compactly designed roller holder 14, which can be handled as a replaceable component with the integrated adjusting device 17 and the rolling cylinder 15, and secured to the base body 12 of the roller burnishing tool 10.

Additional Embodiments

Modifications can of course be made to the embodiment described above without departing from the basic idea of the invention as defined by the claims.

In the embodiment shown, each rolling cylinder 15 is rotatably mounted in a roller cage 15a fixedly arranged on the roller holder 14. However, the angular position of the roller axis 15b, and hence also the alignment of the rolling cylinder 15 as a whole, change with a radial pivoting of the holder arm 18b. In an alternative embodiment, the roller cage 15a can thus be mounted on the holder arm 18b in such a way that the roller axis 15b of the rolling cylinder 15 is aligned according to a changing contact pressure of the workpiece surface to be processed. To this end, the rolling cylinder 15 can be mounted in a roller cage that is mounted on the pivotable holder arm 18b of the roller holder 18 so that it can rotate around a cage axis (see sketched in axis point on FIGS. 2 and 3) that is aligned transverse to the rotational or longitudinal central axis 11 of the roller burnishing tool 10 and stands perpendicular on a longitudinal sectional plane (e.g., see drawing plane on FIG. 2 or 3) of the roller burnishing tool that contains the rotational or longitudinal central axis 11 of the roller burnishing tool 10. In this case, the roller cage with the rolling cylinder 15 can align itself accordingly when exposed to the contact pressure of the workpiece surface to be processed given a pivoting of the holder arm 18b.

In the embodiment shown, the adjusting device 17 is integrated into the roller holder 18. However, this need not necessarily be the case. The adjusting device 17 can instead also be integrated into the base body 12. It is only crucial that the adjusting device be functionally arranged between the roller holder 18 and base body 12.

In the embodiment shown, each pressure pin 26 is radially adjustably arranged in a radially running bore 27 in the base body 12. Alternatively thereto, each pressure pin 26 can be radially adjustably arranged in a guide bush arranged in the base body 12 and not shown on the figures.

In the embodiment shown, the roller burnishing tool 10 is used for cylinder bore processing. However, the invention is not limited to this application.

In addition, in the embodiment shown, several roller holders 14 are arranged on the base body 12 of the roller burnishing tool 10 at an identical height in an axial direction and at prescribed angular distances around the rotational or longitudinal central axis 11 of the base body. However, it is not mandatory that the roller holders be arranged at the identical height in an axial direction. The roller holders 14 can also be arranged axially offset, for example helically offset.

In addition, the roller burnishing tool 10 can have several roller holders 14 as in the embodiment described or precisely one roller holder 14.

In the embodiment shown, the piston 42 is pressurized fluidically, in particular pneumatically or hydraulically. Alternatively thereto, an electric motor or electromagnet can be used to initiate the pressurization of the piston 42. The roller burnishing tool 10 can thus have a hydraulically, pneumatically, electromotively or electromagnetically operating actuator that drives the piston 42.

The control surfaces 31 provided on the threaded sleeve 28 can be provided directly or indirectly, e.g., via strips 30 arranged on the threaded sleeve 28. In addition, the threaded sleeve 28 can have a rotationally symmetrical conical surface instead of individual control surfaces 31, which indirectly or directly supports the roller holder(s) 14.

In the embodiment shown, the roller burnishing tool 10 has an HSC (hollow shaft cone) shaft on the machine tool spindle side. As an alternative thereto, however, a so-called steep taper (ST) shaft or the like can also be provided.

The invention claimed is:

1. A roller burnishing tool, comprising:
   a base body extending along a longitudinal central axis,
   at least one roller holder, the roller holder radially adjustably arranged on the base body,
   a rolling cylinder,
   a threaded sleeve arranged in the base body in a nonrotatable, axially displaceable manner, and
   a threaded spindle, the threaded spindle comprising a threaded section that is threaded with the threaded sleeve such that causing the threaded spindle to rotate drives the threaded sleeve axially,
   the roller holder has a holder arm,
   the rolling cylinder is held on the holder arm, and
   the roller holder can be pivotably deflected in a radial direction relative to the base body by driving the threaded sleeve axially.

2. The roller burnishing tool according to claim 1, wherein the roller burnishing tool comprises a plurality of roller holders including said roller holder, and the plurality roller holders are distributed around the longitudinal central axis.

3. The roller burnishing tool according to claim 2, wherein driving the threaded sleeve axially causes synchronous adjustment of the roller holders in a radial direction.

4. The roller burnishing tool according to claim 2, wherein the roller holders are arranged at the same height as viewed in the axial direction.

5. The roller burnishing tool according to claim 1, wherein the rolling cylinder has a spherical rolling surface that protrudes over the roller holder.

6. The roller burnishing tool according to claim 2, wherein the plurality of roller holders are distributed around the longitudinal central axis with an identical angular division.

7. The roller burnishing tool according to claim 1, wherein the rolling cylinder is mounted in a roller cage fastened to the roller holder.

8. The roller burnishing tool according to claim 7, wherein the roller cage is mounted on the holder arm so that it can rotate around a cage axis that is aligned transverse to the longitudinal central axis of the roller burnishing tool and stands perpendicular on a longitudinal sectional plane of the roller burnishing tool that contains the longitudinal central axis of the roller burnishing tool.

9. The roller burnishing tool according to claim 1, wherein the threaded sleeve comprises a control surface that is slanted relative to the longitudinal central axis.

10. The roller burnishing tool according to claim 9, wherein:
    the roller burnishing tool further comprises a pressure element,
    the pressure element is radially displaceable relative to base body, and
    the holder arm is supported on the control surface via the pressure element.

11. The roller burnishing tool according to claim 1, wherein:
    the threaded spindle comprises a second threaded section and is a differential threaded spindle,
    the roller burnishing tool further comprises a bearing bush held in the base body in a nonrotatable manner, and
    the second threaded section is threaded with the bearing bush.

12. The roller burnishing tool according to claim 11, wherein the bearing bush is connected in an axially tension/pressure-resistant manner with a piston, which borders a pressure chamber in the base body.

13. The roller burnishing tool according to claim 1, wherein the threaded spindle can be actuated on the front side of the base body.

14. The roller burnishing tool according to claim 13, wherein an actuating element is held on the front side of the base body in a rotatable, but axially fixed manner, and engages with the threaded spindle in a nonrotatable, but axially movable manner.

15. The roller burnishing tool according to claim 1, wherein:
    the roller burnishing tool comprises a plurality of roller holders including said roller holder,
    each of the plurality of roller holders is radially adjustably arranged on the base body,
    the roller burnishing tool comprises a plurality of rolling cylinders including said rolling cylinder,
    each of the plurality of rolling cylinders is rotatably mounted on a respective one of the plurality of roller holders,
    all of the plurality roller holders can be synchronously pivotably deflected in a radial direction relative to the base body by driving the threaded sleeve axially.

16. The roller burnishing tool according to claim 15, wherein:
    the roller burnishing tool comprises a plurality of adjusting devices including said adjusting device,
    the plurality of adjusting devices are arranged between each respective roller holder and the threaded sleeve,
    each of the plurality of adjusting devices has a slanted surface, and
    for each of the plurality of adjusting devices, manipulating the adjusting device adjusts the position of a respective roller holder in a radial direction relative to the threaded sleeve.

17. The roller burnishing tool according to claim 1, wherein the roller holder is bendable, and the holder arm can be pivotably deflected via elastic bending in a radial direction.

18. The roller burnishing tool according to claim 1, wherein the roller holder is pivotably mounted on the base body, with a holder arm that can be pivotably deflected in a radial direction.

19. The roller burnishing tool according to claim 1, wherein:
the roller burnishing tool further comprises an adjusting device arranged between the roller holder and the threaded sleeve,
the adjusting device has a slanted surface, and
manipulating the adjusting device adjusts the position of the roller holder in a radial direction relative to the threaded sleeve.

20. The roller burnishing tool according to claim 1, wherein the threaded spindle can be axially displaced by a piston that borders a pressure chamber in the base body.

21. A roller burnishing tool, comprising:
a base body extending along a longitudinal central axis,
at least one roller holder, the roller holder radially adjustably arranged on the base body,
a rolling cylinder, the rolling cylinder rotatably mounted on the roller holder,
a threaded sleeve arranged in the base body,
the roller holder has a holder arm,
the rolling cylinder is held on the holder arm,
the roller holder can be pivotably deflected in a radial direction relative to the base body by driving the threaded sleeve axially,
the rolling cylinder is mounted in a roller cage fastened to the roller holder, and
the roller cage is mounted on the holder arm so that it can rotate around a cage axis that is aligned transverse to the longitudinal central axis of the roller burnishing tool and stands perpendicular on a longitudinal sectional plane of the roller burnishing tool that contains the longitudinal central axis of the roller burnishing tool.

22. A roller burnishing tool, comprising:
a base body extending along a longitudinal central axis,
at least one roller holder, the roller holder radially adjustably arranged on the base body,
a rolling cylinder, the rolling cylinder rotatably mounted on the roller holder,
a threaded sleeve arranged in the base body,
the roller holder has a holder arm,
the rolling cylinder is held on the holder arm,
the roller holder can be pivotably deflected in a radial direction relative to the base body by driving the threaded sleeve axially,
the threaded sleeve comprises a control surface that is slanted relative to the longitudinal central axis,
the roller burnishing tool further comprises a pressure element,
the pressure element is radially displaceable relative to base body, and
the holder arm is supported on the control surface via the pressure element.

\* \* \* \* \*